United States Patent
Cheng

(10) Patent No.: US 11,357,081 B2
(45) Date of Patent: Jun. 7, 2022

(54) HEAT CONDUCTIVE STRIP HAVING A POWER TERMINAL AND METHOD FOR PACKAGING THE SAME

(71) Applicant: TAIWAN TECH CO., LTD., Changhua County (TW)

(72) Inventor: Chen-San Cheng, Changhua County (TW)

(73) Assignee: TAIWAN TECH CO., LTD., Changhua County (TW)

( * ) Notice: Subject to any disclaimer, the term of this patent is extended or adjusted under 35 U.S.C. 154(b) by 449 days.

(21) Appl. No.: 16/408,423

(22) Filed: May 9, 2019

(65) Prior Publication Data

US 2020/0359464 A1 Nov. 12, 2020

(51) Int. Cl.
*H05B 3/14* (2006.01)
*B29C 69/00* (2006.01)
*B29K 101/12* (2006.01)

(52) U.S. Cl.
CPC .............. *H05B 3/145* (2013.01); *B29C 69/00* (2013.01); *B29K 2101/12* (2013.01); *B29K 2995/0013* (2013.01); *H05B 2203/017* (2013.01)

(58) Field of Classification Search
CPC .... H05B 3/145; H05B 3/34; H05B 2203/017; B29C 69/00; B29K 2995/0013; B29K 2101/12
See application file for complete search history.

(56) References Cited

U.S. PATENT DOCUMENTS

| 4,252,990 A * | 2/1981 | Sado | H01C 1/02 174/541 |
| 10,368,400 B2 * | 7/2019 | Cheng | H05B 3/06 |

FOREIGN PATENT DOCUMENTS

TW 99109336 A1 10/2011

* cited by examiner

*Primary Examiner* — Shawntina T Fuqua
(74) *Attorney, Agent, or Firm* — Bruce Stone LLP; Joseph A. Bruce

(57) ABSTRACT

A heat conductive strip having a power terminal and a method for packaging the same, wherein the heating conductive strip having a power terminal packaged by the packaging method includes: a carbon fiber unit composed of a plurality of carbon fibers and having a carbon fiber portion; a plastic sleeve covering the carbon fiber unit and having a clamping end portion that covers the carbon fiber portion; a power terminal inserted into the carbon fiber unit and including: a first metal end in electrical contact with the carbon fiber portion, and a second metal end opposite to the first metal end and exposed out of the plastic sleeve; and a fixing member sleeved on the clamping end portion of the plastic sleeve to enable the clamping end portion, the carbon fiber portion and the first metal end to be integrated into one body.

8 Claims, 9 Drawing Sheets

---

(A) coating a carbon fiber unit with a plastic sleeve, wherein the plastic sleeve has a clamping end portion, and the carbon fiber unit has a carbon fiber portion covered by the clamping end portion ;

(B) inserting the power terminal into the plastic sleeve, making a first metal end of the power terminal be in electrical contact with the carbon fiber portion, and a second metal end of the power terminal exposed out of the plastic sleeve ;

(C) taking a fixing member and sleeving it onto the clamping end portion of the plastic sleeve, enabling the clamping end portion, the carbon fiber portion, and the first metal end to be integrated into one body after being pressurized.

(A) coating a carbon fiber unit with a plastic sleeve, wherein the plastic sleeve has a clamping end portion, and the carbon fiber unit has a carbon fiber portion covered by the clamping end portion ;

(D) includes injecting a conductive material in the plastic sleeve and the conductive material is in contact with the carbon fiber unit ;

(B) inserting the power terminal into the plastic sleeve, making a first metal end of the power terminal be in electrical contact with the carbon fiber portion, and a second metal end of the power terminal exposed out of the plastic sleeve, the first metal end of the power terminal is adhered to the carbon fiber portion of the carbon fiber unit by the conductive material ;

(C) taking a fixing member and sleeving it onto the clamping end portion of the plastic sleeve, enabling the clamping end portion, the carbon fiber portion, and the first metal end to be integrated into one body after being pressurized.

FIG.10

HEAT CONDUCTIVE STRIP HAVING A POWER TERMINAL AND METHOD FOR PACKAGING THE SAME

BACKGROUND

Field of the Invention

The present invention relates to a heat conductive strip, and more particularly to a heat conductive strip having a power terminal and a method for packaging the same.

Related Prior Art

Heat conductive strips having the properties of flexibility and thinness are usually used in blankets, clothing, knee pads, waist protectors, gloves, insoles, earmuffs or lumbar support to provide a warm wrap for the human body.

Referring to the Taiwan patent application No. 99109336 entitled "Method for Manufacturing a Flexible Flat Strip Heater Using Carbon Fiber Filament as a Heat Source", which includes the following steps: (a) using a carbon fiber layer; (b) placing thermoplastic materials on opposite sides of the carbon fiber layer; (c) using a rolling method to make the self-adhesively bonded thermoplastic materials bonded to each other to cover the carbon fiber layer inside; and (d) disposing a power terminal at opposite ends of the carbon fiber layer. The flexible flat strip heater can be widely used for small articles such as clothes, waist protectors, gloves, and large articles such as blankets and quilts, and is used as a source of heat for keeping human body warm.

The characteristics of carbon fibers are high strength, high elasticity, high heat oxidation resistance, excellent thermal conductivity and electromagnetic shielding, abrasion resistance, vibration resistance, X-ray penetration, impact resistance, dimensional stability, and excellent biocompatibility. The relative disadvantage is that the compound material made of carbon fibers has poor immersion property with the metal, and is likely to break at the moment of the impact.

Referring to FIG. 1, before the power terminal 110 of the heat conductive strip 100 is packed, the carbon fiber layer 120 has a bonding section 1210 exposed at both ends of the thermoplastic sleeve 130. The power terminal 110 is directly clamped to the bonding section 1210 of the carbon fiber layer 120 during packaging. Therefore, the power terminal 110 is likely to cut off the bonding section 1210 of the carbon fiber layer 120 during the packaging process, which highlights the defect of low yield. In addition, just because the power terminal 110 is directly clamped to the bonding section 1210 of the carbon fiber layer 120 during packaging, when the power terminal 110 is repeatedly bent relative to the thermoplastic sleeve 130, part of or even the whole the carbon fiber layer 120 is easily broken by the power terminal, which highlights a defect of insufficient service life and increases the problem of poor contact.

In addition, the power terminal 110 of the heat conductive strip 100 is clamped to the thermoplastic sleeve 130 by a fixing device before being packaged, so that one end of the thermoplastic sleeve 130 is fixed. Then another end of the thermoplastic sleeve 130 is clamped by a pulling device which is pulled in a direction away from the fixing device, so that a part of the thermoplastic sleeve 130 is ripped off the original thermoplastic sleeve 130, and a part of the carbon fiber layer 120 is exposed out of the thermoplastic sleeve 130. However, ripping off the thermoplastic sleeve 130 is also prone to the problem of breaking the carbon fiber layer 120, so that how to solve the above-mentioned problems and disadvantages is the direction for the improvement of the present invention.

The present invention has arisen to mitigate and/or obviate the afore-described disadvantages.

SUMMARY

One objective of the present invention is to provide a heat conductive strip having a power terminal and a method for packaging the same, which is capable of solving the conventional problem that the carbon fibers are likely to be broken when the plastic sleeve is peeled off and due to the fact that the power terminal directly contacts the carbon fibers during packaging process, thus reducing the possibility of breakage of the carbon fibers, preventing contact failure and extending service life.

To achieve the above objective, a method for packaging a heat conductive strip having a power terminal in accordance with the present invention, comprising the following steps: (A) coating a carbon fiber unit with a plastic sleeve, wherein the plastic sleeve has a clamping end portion, and the carbon fiber unit has a carbon fiber portion covered by the clamping end portion; (B) inserting the power terminal into the plastic sleeve, making a first metal end of the power terminal be in electrical contact with the carbon fiber portion, and a second metal end of the power terminal exposed out of the plastic sleeve; and (C) taking a fixing member and sleeving it onto the clamping end portion of the plastic sleeve, enabling the clamping end portion, the carbon fiber portion, and the first metal end to be integrated into one body after being pressurized.

Preferably, the first and second metal ends of the power terminal are identical in structure, the first metal end is provided with a first circular hole, the second metal end is provided with a second circular hole, when the fixing member is pressurized, the carbon fiber portion is partially concaved toward the first circular hole to form a convex arc portion which is to be engaged at an edge of the first circular hole.

Preferably, the method for packaging the heat conductive strip having the power terminal further comprises a step (D) between the step (A) and the step (B), the step (D) includes injecting a conductive material in the plastic sleeve and the conductive material is in contact with the carbon fiber unit and the power terminal, in the step (B), the first metal end of the power terminal is adhered to the carbon fiber portion of the carbon fiber unit by the conductive material to improve electric conductivity between the carbon fiber unit and the power terminal.

Preferably, a width of the fixing member after being packaged is greater than a width of the plastic sleeve.

Preferably, the carbon fiber portion includes a first carbon fiber portion and a second carbon fiber portion, and the first metal end of the power terminal is disposed between the first and second carbon fiber portions.

Preferably, in the step (C), after being pressurized, the fixing member is spaced apart from an edge of the plastic sleeve by a distance.

To achieve the above objective, the present invention further provides a heat conductive strip having a power terminal, which comprises: a carbon fiber unit composed of a plurality of carbon fibers and having a carbon fiber portion; a plastic sleeve covering the carbon fiber unit and having a clamping end portion that covers the carbon fiber portion; a power terminal inserted into the carbon fiber unit and including: a first metal end in electrical contact with the carbon fiber portion, and a second metal end opposite to the first metal end and exposed out of the plastic sleeve; and a fixing member sleeved on the clamping end portion of the plastic sleeve to enable the clamping end portion, the carbon fiber portion and the first metal end to be integrated into one body.

Preferably, the carbon fiber portion includes a first carbon fiber portion and a second carbon fiber portion, and the first metal end of the power terminal is adhered to the first and second carbon fiber portions by a conductive material.

Preferably, the first and second metal ends of the power terminal are identical in structure, the first metal end is provided with a first circular hole, and the second metal end is provided with a second circular hole.

Preferably, the fixing member is spaced apart from an edge of the plastic sleeve by a distance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

FIG. 10 is a flow chart of the third embodiment of the present invention.

DETAILED DESCRIPTION

Figure 1:
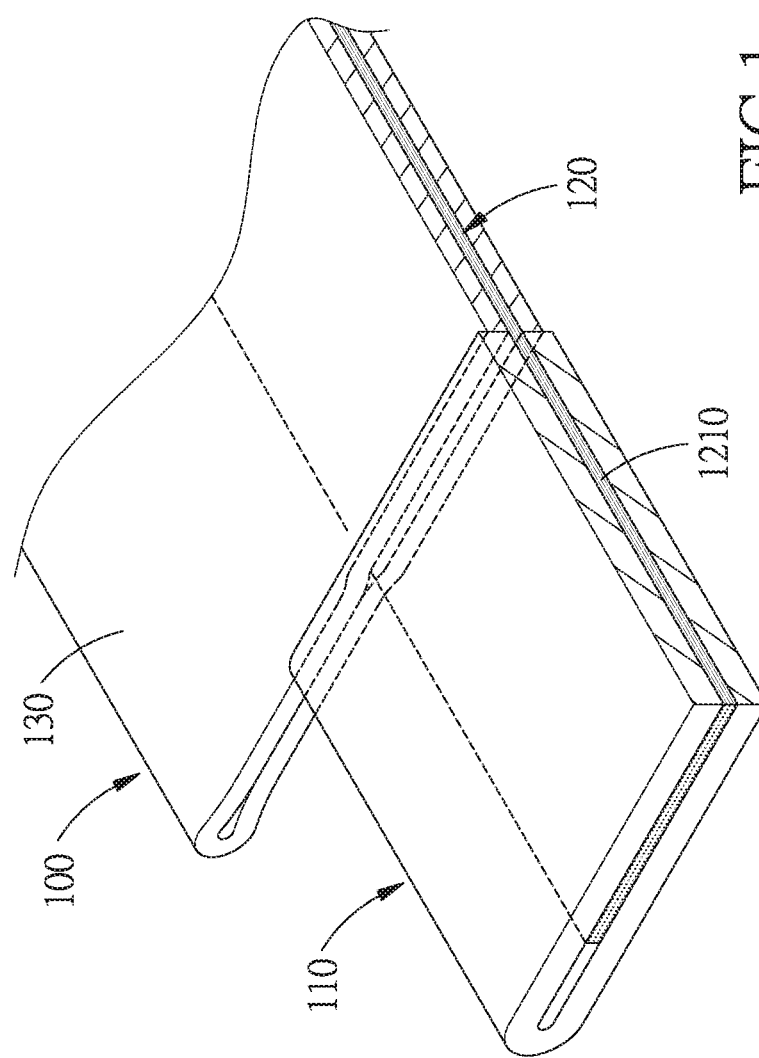
FIG. 1 is a partial perspective cross-sectional view of a conventional heat conductive strip.
Figure 2:
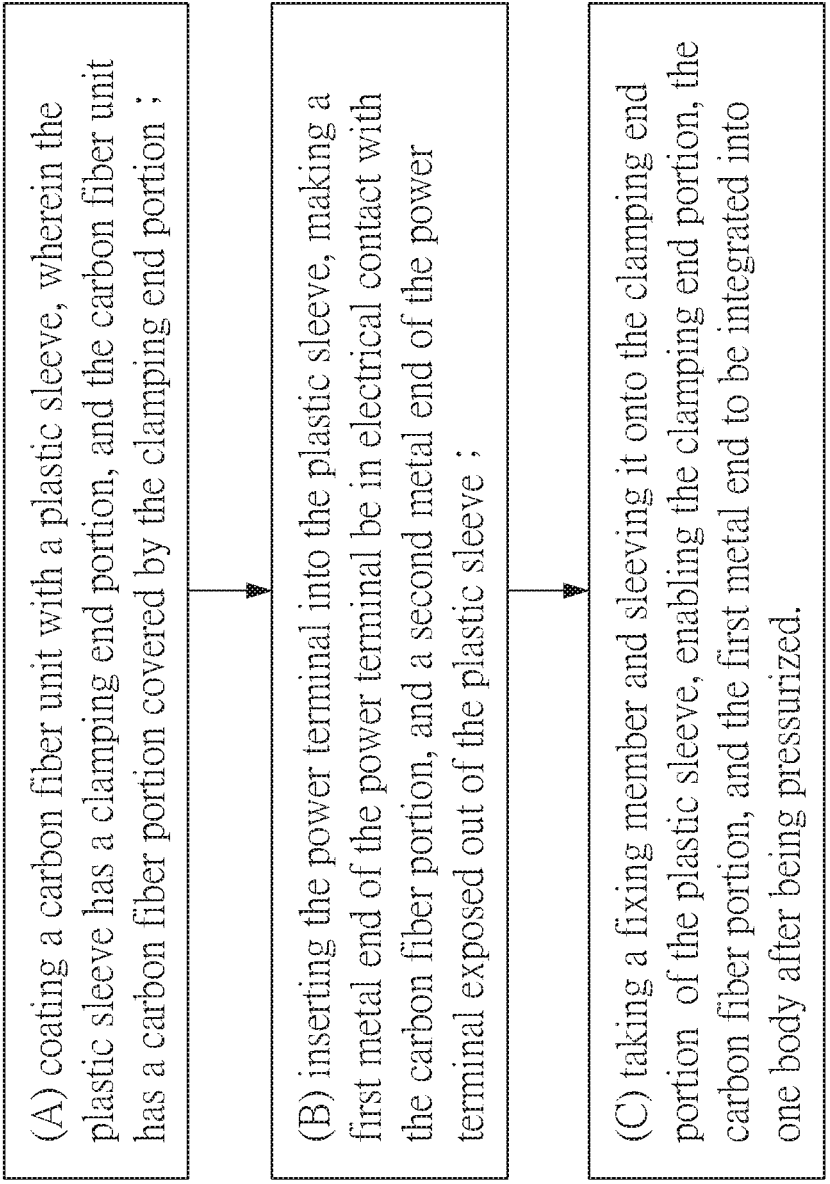
FIG. 2 is a flow chart of a first embodiment of the present invention.
Figure 3:
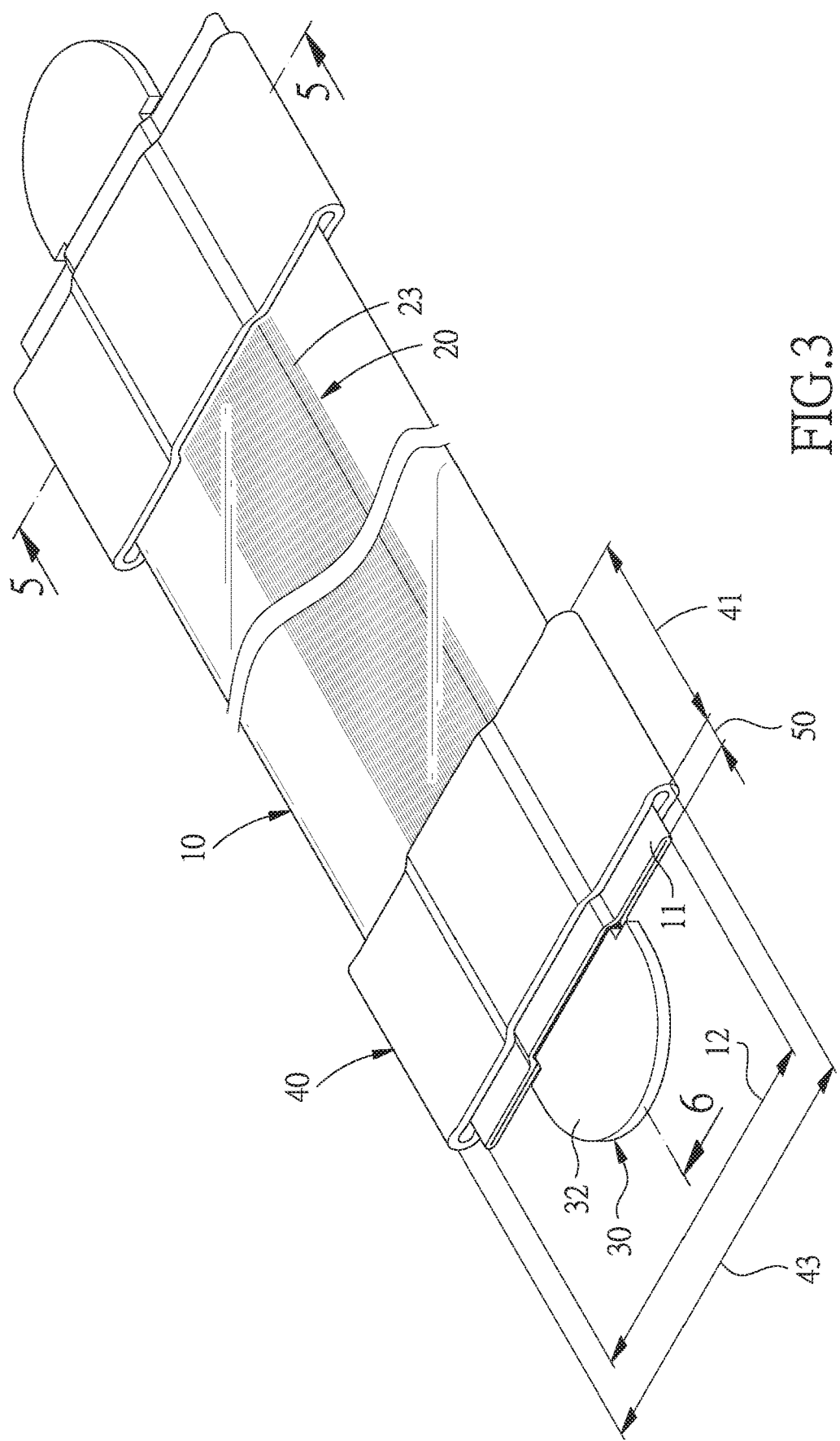
FIG. 3 is an assembly perspective view of the first embodiment of the present invention.
Figure 4:
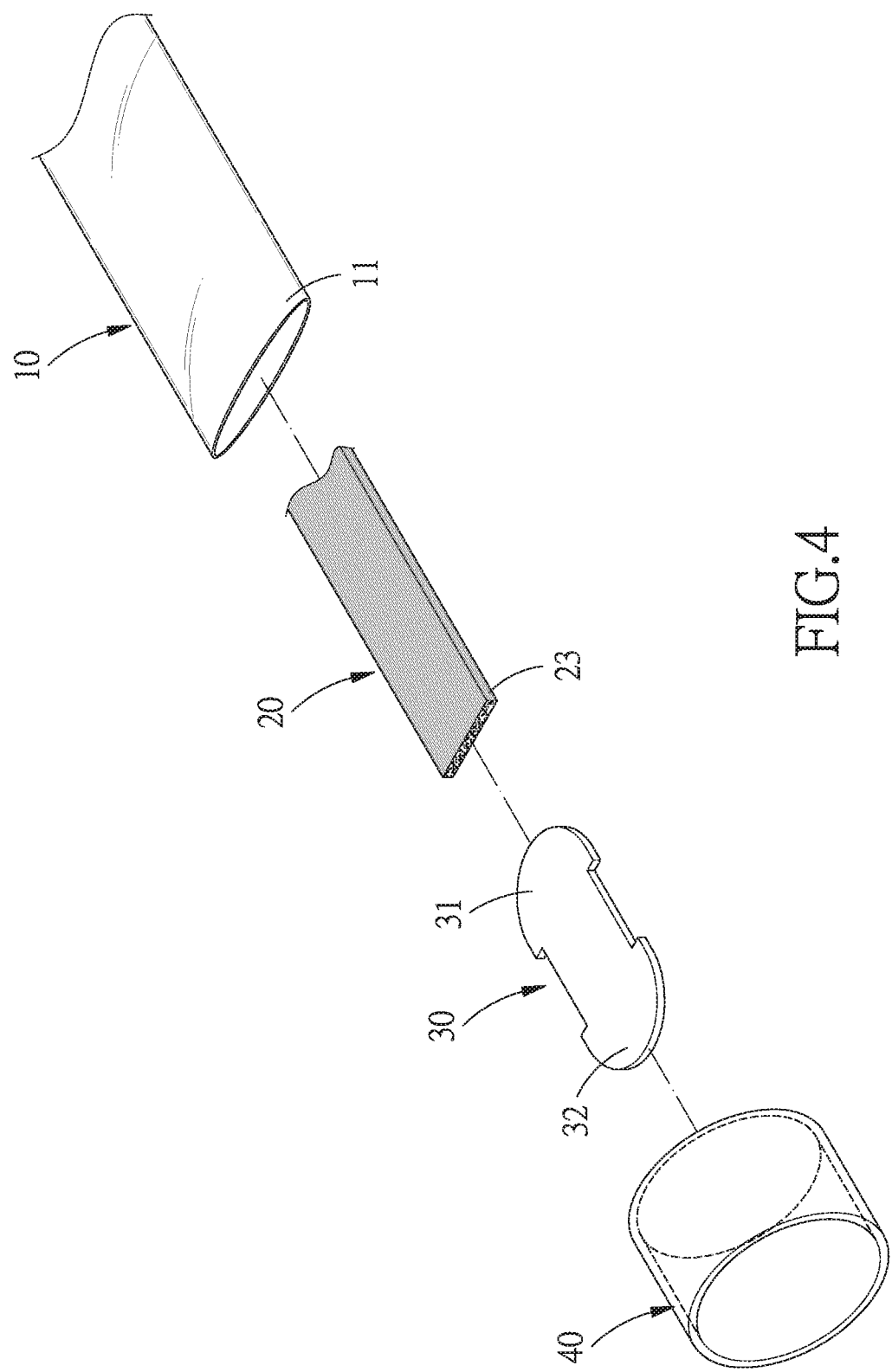
FIG. 4 is an exploded perspective view of the first embodiment of the present invention.
Figure 5:
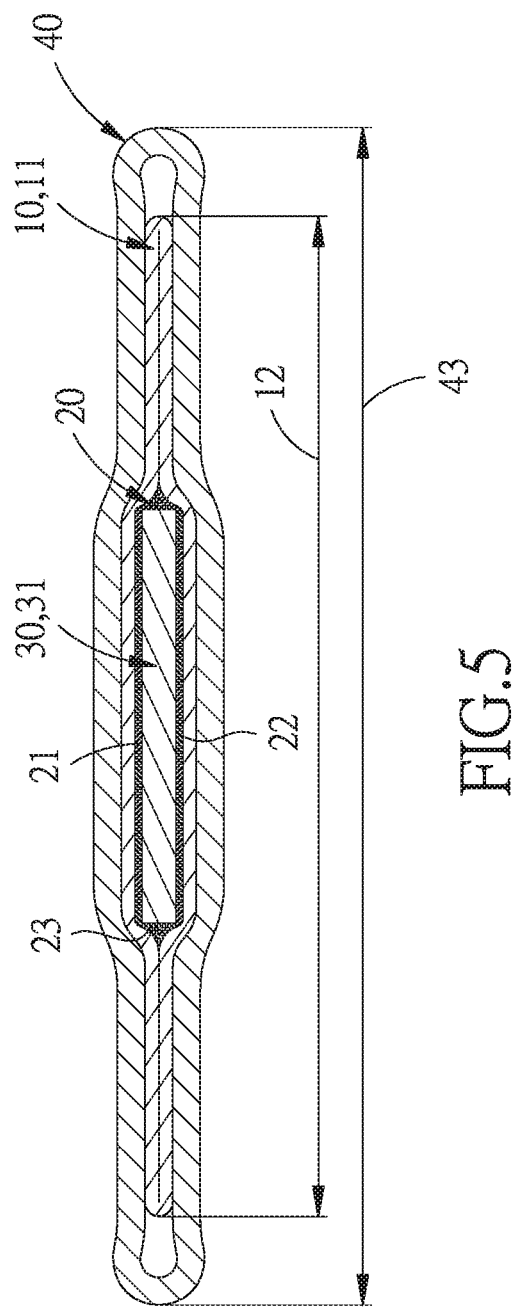
FIG. 5 is a cross-sectional view taken along the line 5-5 of FIG. 3.
Figure 6:
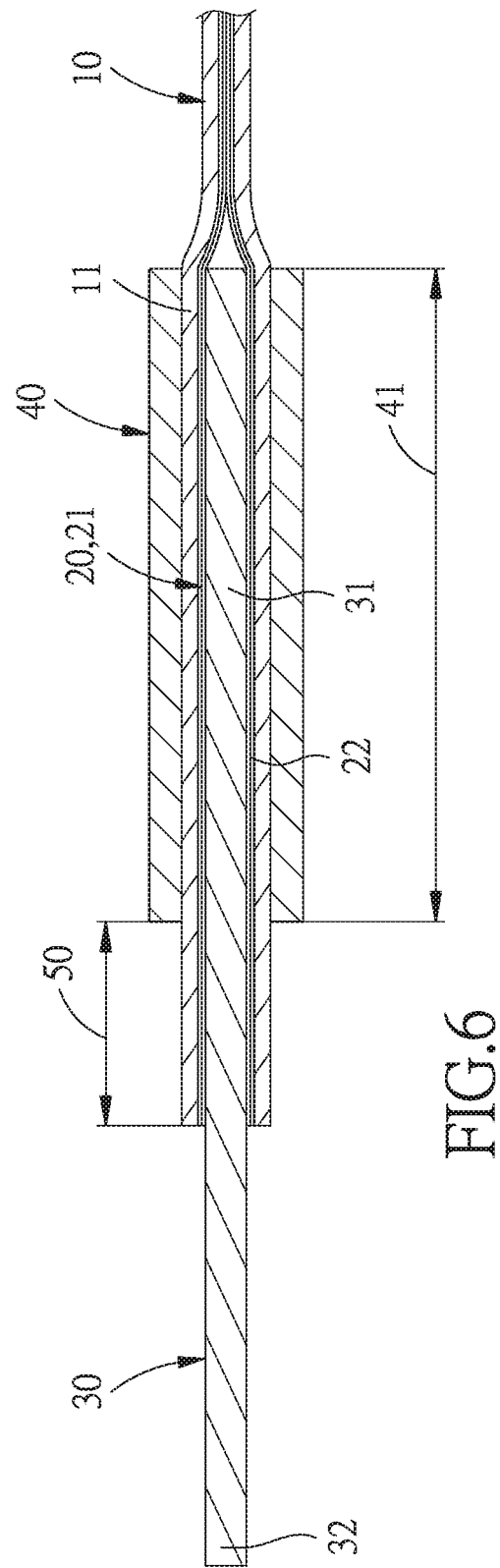
FIG. 6 is a cross-sectional view taken along the line 6 of FIG. 3.

The present invention will be clearer from the following description when viewed together with the accompanying drawings, which show, for purpose of illustrations only, the preferred embodiment in accordance with the present invention.

Referring to FIGS. 2-6, a method for packaging a heat conductive strip having a power terminal in accordance with the preferred embodiment of the present invention comprises the following steps:

(A) coating a carbon fiber unit 20 with a plastic sleeve 10, wherein the plastic sleeve 10 has a clamping end portion 11, and the carbon fiber unit 20 has a first carbon fiber portion 21 and a second carbon fiber portion 22 that are covered by the clamping end portion 11. In this embodiment, a length of the plastic sleeve 10 is equal to that of the carbon fiber unit 20. The carbon fiber unit 20 is composed of a plurality of carbon fibers 23, and each of the carbon fibers 23 is a fibrous material having both chemical inertness and semiconductor properties, and has the advantages of light weight, high strength, high elasticity, high temperature resistance and acid resistance, long-term stress without latent change, fatigue resistance, strong dimensional stability, high thermal conductivity, small thermal expansion coefficient, small friction coefficient, and lubricity. In addition to high strength and light weight, the other advantages of the carbon fibers 23 further include that the specific heat and conductivity are between non-metal and metal, the coefficient of thermal expansion is small, and the corrosion resistance is good.

(B) inserting the power terminal 30 into the plastic sleeve 10, the power terminal 30 has a first metal end 31 disposed between the first and second carbon fiber portions 21, 22, and a second metal end 32 opposite to the first metal end 31 and exposed out of the plastic sleeve 10. In this embodiment, the first metal end 31 and the second metal end 32 of the power terminal 30 have the same structure.

(C) taking a fixing member 40 and sleeving it onto the clamping end portion 11 of the plastic sleeve 10, enabling the clamping end portion 11, the first carbon fiber portion 21, the second carbon fiber portion 22, and the first metal end 31 to be integrated into one body. After the fixing member 40 is pressurized, the fixing member 40 is spaced apart from the edge of the plastic sleeve 10 by a distance 50. In this embodiment, the length 41 of the fixing member 40 is 4 mm for example, but not limited thereto, it may be greater than 2 mm and less than or equal to 8 mm, and the width 43 of the fixing member 40 after being pressurized is greater than the width 12 of the plastic sleeve 10, thereby preventing the plastic sleeve 10 from being twisted and deformed to damage the carbon fiber unit 20 covered by the plastic sleeve 10. In addition, the fixing member 40 is spaced apart from the edge of the plastic sleeve 10 by a distance 50 after being pressurized, which prevents the fixing member 40 from coining into contact with the power terminal 30 after being pressurized.

Figure 7:
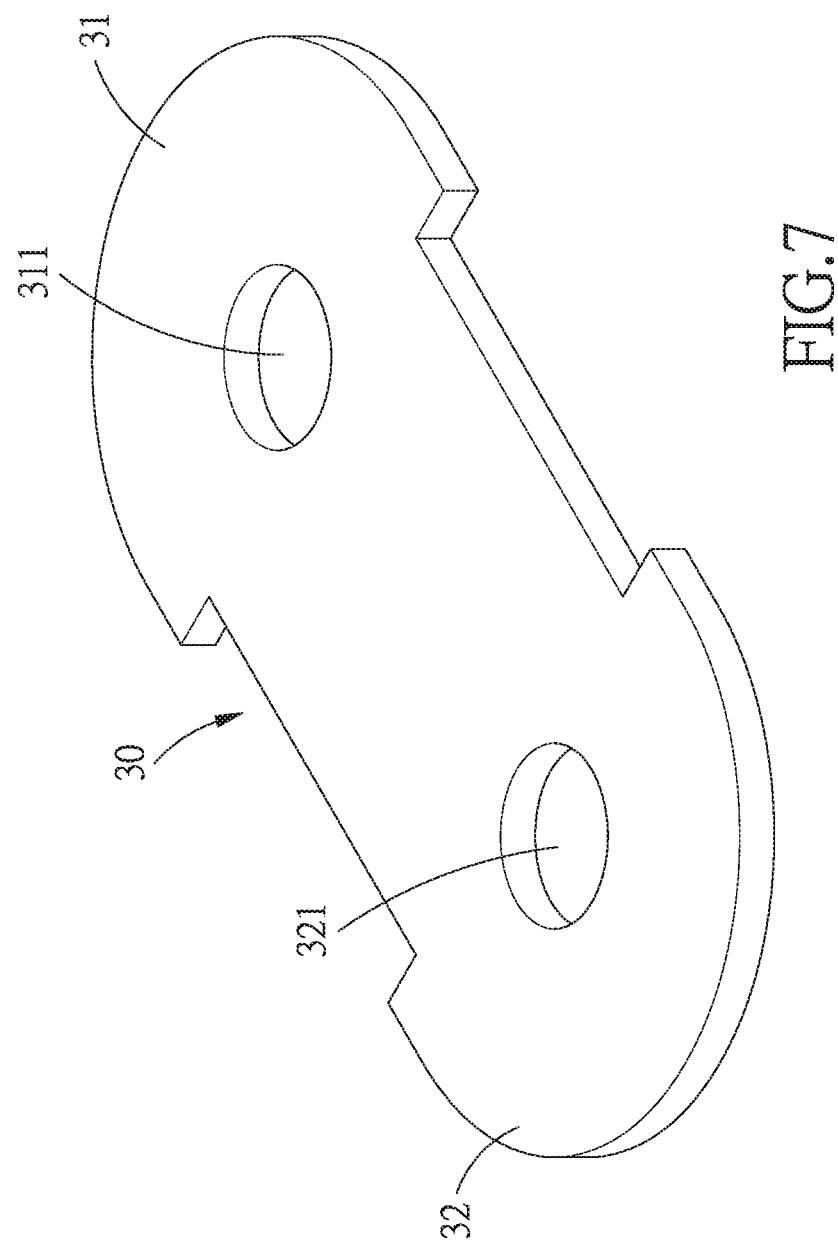
FIG. 7 is a perspective view of one of the components of the second embodiment of the present invention showing the first circular hole and the second circular hole of the metal ends.
Figure 8:
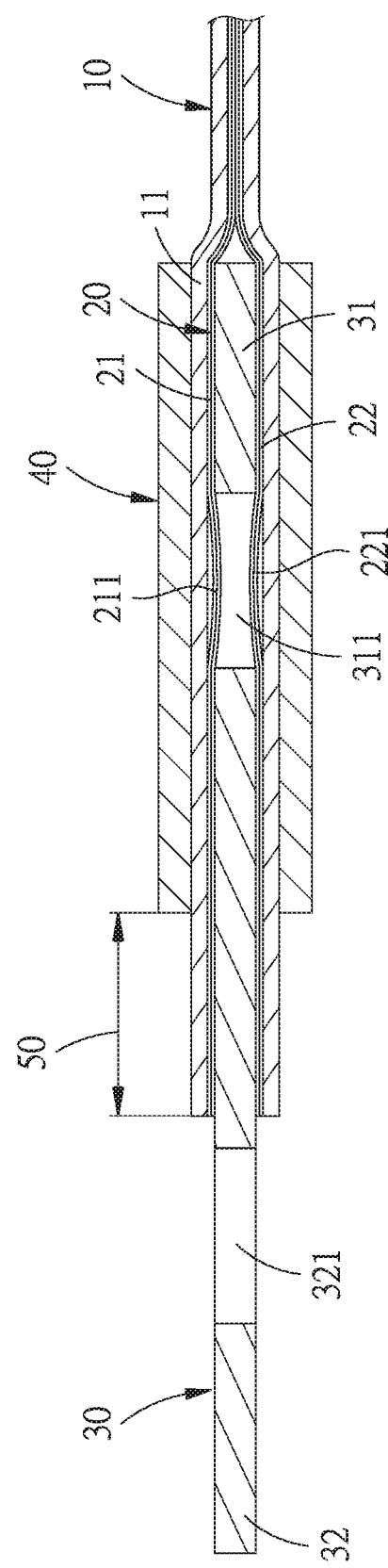
FIG. 8 is a cross-sectional view showing the second embodiment of the present invention.

Referring to FIG. 7, in some embodiments, the first and second metal ends 31, 32 of the power terminal 30 are identical in structure. The first metal end 31 is provided with a first circular hole 311, the second metal end 32 is provided with a second circular hole 321. As shown in FIG. 8, when the fixing member 40 is pressurized, the first carbon fiber portion 21 and the second carbon fiber portion 22 will be partially concaved toward the first circular hole 311 to form convex arc portions 211, 221 which can be engaged at the edge of the first circular hole 311, so as to prevent the power terminal 30 from being detached by pulling, and the overall safety is improved.

Figure 9:
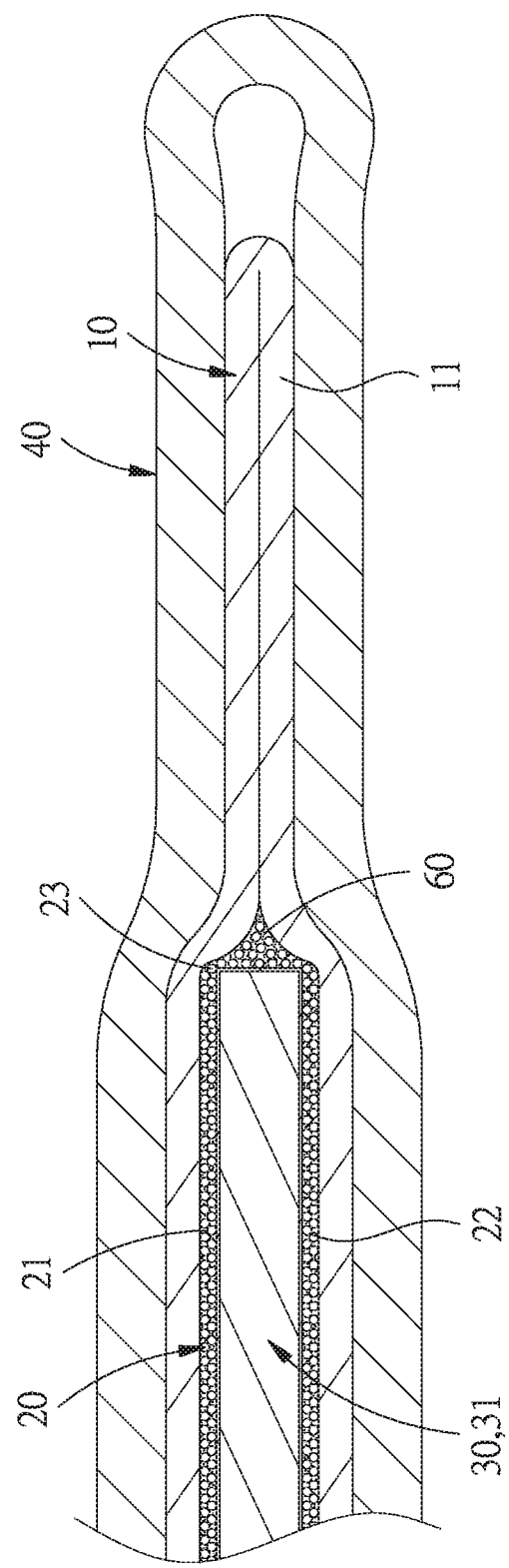
FIG. 9 is an enlarged cross-sectional view showing a third embodiment of the present invention.

Referring to FIGS. 9-10, in some embodiments, the method for packaging a heat conductive strip having a power terminal in accordance with the present invention further comprise a step (D) between the step (A) and the step (B), the step (D) includes injecting a conductive silver paste 60 in the plastic sleeve 10 and the conductive silver paste 60 is in contact with the carbon fiber unit 20 and the power terminal 30, which is not limited thereto, and can also be copper glue, nickel glue, the silver metal glue, the carbon glue, the carbon glue, etc., in the step (B), the first metal end 31 of the power terminal 30 can be adhered to the first and second carbon fiber portions 21, 22 of the carbon fiber unit 20. The conductive silver paste 60 is a liquid containing a thermosetting polyester resin and uniformly dispersed fine chemical silver powder, and has characteristics such as instantaneous or rapid curing, low resistance and high electrical conductivity. After being inserted into the carbon fiber unit 20, the first metal end 31 of the power terminal 30 can be instantly adhered to the first and second carbon fiber portions 21, 22, to allow the power terminal 30 to be firmly bonded to the carbon fiber unit 20, thereby achieving the characteristics of being difficult to separate and having high electrical conductivity.

What mentioned above are the steps of the method for packaging a heat conductive strip having a power terminal in accordance with the present invention. Referring to FIGS. 2-6, a heat conductive strip having a power terminal provided by the invention essentially comprises: the plastic sleeve 10, the carbon fiber unit 20, the power terminal 30, and the fixing member 40.

The carbon fiber unit 20 is composed of a plurality of carbon fibers 23 and has a first carbon fiber portion 21 and a second carbon fiber portion 22. In this embodiment, the first carbon fiber portion 21 is located in the upper half of the carbon fiber unit 20, the second carbon fiber portion 22 is located in the lower half of the carbon fiber unit 20, and the first carbon fiber portion 21 has two ends connected to two ends of the second carbon fiber portion 22.

The plastic sleeve 10 covers the carbon fiber unit 20 and has a clamping end portion 11 that covers the first carbon fiber portion 21 and the second carbon fiber portion 22.

The power terminal 30 is inserted into the carbon fiber unit 20 and includes: a first metal end 31 disposed between the first and second carbon fiber portions 21, 22, and a second metal end 32 opposite to the first metal end 31 and exposed out of the plastic sleeve 10.

The fixing member 40 is sleeved on the clamping end portion 11 of the plastic sleeve 10 to enable the clamping end portion 11, the first carbon fiber portion 21, the second carbon fiber portion 22 and the first metal end 31 to be integrated into one body, and the fixing member 40 is spaced apart from the edge of the plastic sleeve 10 by a distance 50. In this embodiment, with the distance 50, the fixing member 40 can be prevented from coining into contact with the power terminal 30 when being pressurized.

Accordingly, the present invention is characterized in that the first metal end 31 of the power terminal 30 is interposed between the first and carbon fiber portions 21, 22, the second metal end 32 is exposed out of the plastic sleeve 10, and the power terminal 30 is in electrical contact with the carbon fiber unit 20. When the present invention is being packaged, the outer surface of the plastic sleeve 10 is clamped by the fixing member 40 to make the clamping end portion 11, the first carbon fiber portion 21, the second carbon fiber portion 22 and the first metal end 31 be integrated into one body, so as to improve the conventional problem that the carbon fibers 23 are likely to be broken when being clamped, reducing the possibility of breakage of the carbon fibers 23, preventing contact failure and extending service life.

It should be noted that, as shown in FIGS. 7 and 8, the first and second metal ends 31, 32 of the power terminal 30 have the same structure, the first metal end 31 is provided with the first circular hole 311, the second metal end 32 is provided with the second circular hole 321, so that when the present invention is being packaged, the first carbon fiber portion 21 and the second carbon fiber portion 22 will be partially concaved toward the first circular hole 311 to form convex arc portions 211, 221 which can be engaged at the edge of the first circular hole 311, so as to prevent the power terminal 30 from being detached by pulling, and the overall safety is improved.

It is to be noted that, as shown in FIG. 9, the power terminal 30 is adhered to the first carbon fiber portion 21 and the second carbon fiber portion 22 by a conductive silver paste 60, which is not limited thereto, and can also be copper glue, nickel glue, silver glue, silver carbon glue, carbon glue, etc., which mainly increases the stability of the power terminal 30 when being inserted, so that the power terminal 30 is not easily separated from the carbon fiber unit 20 and has high electrical conductivity.

While we have shown and described various embodiments in accordance with the present invention, it is clear to those skilled in the art that further embodiments may be made without departing from the scope of the present invention.

What is claimed is:

1. A method for packaging a heat conductive strip having a power terminal, comprising the following steps:
    (A) coating a carbon fiber unit with a plastic sleeve, wherein the plastic sleeve has a clamping end portion, and the carbon fiber unit has a carbon fiber portion covered by the clamping end portion;
    (B) inserting the power terminal into the plastic sleeve, making a first metal end of the power terminal be in electrical contact with the carbon fiber portion, and a second metal end of the power terminal exposed out of the plastic sleeve; and
    (C) taking a fixing member and sleeving it onto the clamping end portion of the plastic sleeve, enabling the clamping end portion, the carbon fiber portion, and the first metal end to be integrated into one body after being pressurized;
    wherein in the step (C), after being pressurized, the fixing member is spaced apart from an edge of the plastic sleeve by a distance.

2. The method for packaging the heat conductive strip having the power terminal as claimed in claim 1, wherein the first and second metal ends of the power terminal are identical in structure, the first metal end is provided with a first circular hole, the second metal end is provided with a second circular hole, when the fixing member is pressurized, the carbon fiber portion is partially concaved toward the first circular hole to form a convex arc portion which is to be engaged at an edge of the first circular hole.

3. The method for packaging the heat conductive strip having the power terminal as claimed in claim 1 further comprising a step (D) between the step (A) and the step (B), the step (D) includes injecting a conductive material in the plastic sleeve and the conductive material is in contact with the carbon fiber unit and the power terminal, in the step (B), the first metal end of the power terminal is adhered to the carbon fiber portion of the carbon fiber unit by the conductive material to improve electric conductivity between the carbon fiber unit and the power terminal.

4. The method for packaging the heat conductive strip having the power terminal as claimed in claim 1, wherein a width of the fixing member after being packaged is greater than a width of the plastic sleeve.

5. The method for packaging the heat conductive strip having the power terminal as claimed in claim 1, wherein the carbon fiber portion includes a first carbon fiber portion and a second carbon fiber portion, and the first metal end of the power terminal is disposed between the first and second carbon fiber portions.

6. A heat conductive strip having a power terminal comprises:
    a carbon fiber unit composed of a plurality of carbon fibers and having a carbon fiber portion;

a plastic sleeve covering the carbon fiber unit and having a clamping end portion that covers the carbon fiber portion;

a power terminal inserted into the carbon fiber unit and including: a first metal end in electrical contact with the carbon fiber portion, and a second metal end opposite to the first metal end and exposed out of the plastic sleeve; and a fixing member sleeved on the clamping end portion of the plastic sleeve to enable the clamping end portion, the carbon fiber portion and the first metal end to be integrated into one body;

wherein the fixing member is spaced apart from an edge of the plastic sleeve by a distance.

7. The heat conductive strip having the power terminal as claimed in claim 6, wherein the carbon fiber portion includes a first carbon fiber portion and a second carbon fiber portion, and the first metal end of the power terminal is adhered to the first and second carbon fiber portions by a conductive material.

8. The heat conductive strip having the power terminal as claimed in claim 6, wherein the first and second metal ends of the power terminal are identical in structure, the first metal end is provided with a first circular hole, and the second metal end is provided with a second circular hole.

\* \* \* \* \*